United States Patent [19]
Plaehn

[11] Patent Number: 6,086,313
[45] Date of Patent: *Jul. 11, 2000

[54] DUAL PULL OPEN BOTTOM PORTABLE PICKUP TRUCK TRAILER UNLOADER SYSTEM

[76] Inventor: Jay L. Plaehn, 1765 Garnet Ave. #68, San Diego, Calif. 92109

[*] Notice: This patent issued on a continued prosecution application filed under 37 CFR 1.53(d), and is subject to the twenty year patent term provisions of 35 U.S.C. 154(a)(2).

[21] Appl. No.: 08/942,869

[22] Filed: Oct. 2, 1997

[51] Int. Cl.$^7$ ...................................................... B60P 1/00
[52] U.S. Cl. ........................... 414/515; 414/492; 414/509
[58] Field of Search .................................... 414/477, 478, 414/492, 506, 507, 509, 514, 515, 539, 679, 500, 521, 522, 559; 298/1 A, 12

[56] References Cited

U.S. PATENT DOCUMENTS

| | | | |
|---|---|---|---|
| 766,866 | 8/1904 | Bendickson | 414/515 X |
| 813,050 | 2/1906 | Maine | 414/514 X |
| 845,100 | 2/1907 | Kohout | 414/500 X |
| 939,758 | 11/1909 | Tillery | 414/514 |
| 1,561,157 | 11/1925 | Greer | 414/559 X |
| 2,515,334 | 7/1950 | Buye et al. | 298/12 X |
| 2,640,613 | 6/1953 | Kuhl | 414/515 |
| 2,760,659 | 8/1956 | Drake | 414/515 |
| 3,411,825 | 11/1968 | Fulton | 298/1 A |
| 3,446,534 | 5/1969 | King . | |
| 3,630,571 | 12/1971 | Saldana . | |
| 3,659,899 | 5/1972 | Philips . | |
| 3,740,097 | 6/1973 | Parker et al. . | |
| 3,871,706 | 3/1975 | Odom . | |
| 3,904,049 | 9/1975 | Prahst . | |
| 3,978,996 | 9/1976 | Oltrogge . | |
| 4,004,703 | 1/1977 | Johnson, Jr. | 414/679 |
| 4,030,751 | 6/1977 | Bobka . | |
| 4,082,136 | 4/1978 | Lutz et al. . | |
| 4,084,851 | 4/1978 | Duncan, Sr. . | |
| 4,111,318 | 9/1978 | Lutz . | |
| 4,113,122 | 9/1978 | Lutz . | |
| 4,126,357 | 11/1978 | Day . | |
| 4,572,579 | 2/1986 | Saito . | |
| 4,629,390 | 12/1986 | Burke . | |
| 4,647,110 | 3/1987 | McKee | 414/477 X |
| 4,681,371 | 7/1987 | Leonard . | |
| 4,784,563 | 11/1988 | Esh et al. . | |
| 4,842,471 | 6/1989 | Hodgetts . | |
| 5,143,508 | 9/1992 | Lutz . | |
| 5,156,518 | 10/1992 | Van Matre | 414/507 X |
| 5,273,390 | 12/1993 | Crissman | 414/492 X |
| 5,340,266 | 8/1994 | Hodgetts . | |
| 5,447,361 | 9/1995 | Phillips . | |

FOREIGN PATENT DOCUMENTS

| | | | |
|---|---|---|---|
| 2243943 | 3/1974 | Germany | 414/515 |
| 2245243 | 1/1992 | United Kingdom | 414/559 |

*Primary Examiner*—James W. Keenan
*Attorney, Agent, or Firm*—Welsh & Katz, Ltd.

[57] ABSTRACT

The Dual Pull Open Bottom Portable Pickup Truck Trailer Unloader System is an unloader device that facilitates the easy removal of material from trucks and trailers by the means of hand power or electric or hydraulic motor drive. The open bottom permits the material to slide along the bottom of the truck to either fall directly on the ground when operated or to be slid to the back of the vehicle to be unloaded by hand or by equipment. The dual pull chain, cable, rope or strap system creates an even pull on the unloader box to prevent binding from unevenly distributed loads in the vehicle's cargo space and inside the U-shaped unloader box. This adaptable system with an open bottom, back board and side boards is a sliding mechanism that can be custom-made to fit specific design requirements. The size of back board and size and height of side boards are determined by the specific requirements of each unloading application.

5 Claims, 1 Drawing Sheet

DUAL PULL OPEN BOTTOM PORTABLE PICKUP TRUCK TRAILER UNLOADER SYSTEM

BACKGROUND OF INVENTION

This invention serves as a truck unloader system that helps reduce the work necessary to unload debris, sand, gravel, etc. from pick-up trucks. This unloader system with its dual pull open bottom feature is adaptable to various vehicles for easy unloading. It was primarily invented to help unload construction debris from pickup trucks, but can be adapted to unload material from larger trucks and trailers.

DESCRIPTION OF PRIOR ART

U.S. Pat. Nos. 3,630,571; 4,084,851; 3,740,097; 3,659,899; 3,871,706; 4,030,751; 3,446,534; 5,447,361; 4,572,579; 4,126,357; 4,681,371 all utilize a solid bottom cargo box that is mechanically lifted or slid into a tilt position to remove cargo or debris from a solid bottom cargo box that fits on or in a truck or trailer. These inventions are vastly different form the Dual Pull Open Bottom Portable Pickup Truck Trailer Unloader System that slides cargo or debris on the bottom of the vehicle to the back of the vehicle where it is unloaded or falls through the open bottom directly onto the ground.

U.S. Pat. Nos. 3,904,049; 5,340,266; 4,842,471; 4,784,563; 4,629,390; 5,156,518; 3,978,996 all utilize a temporary or permanently mounted conveyer belt on which cargo is placed directly on top and that, when in motion, transports cargo or debris to the back of the vehicle where it is unloaded or falls directly onto the ground. These inventions are vastly different from the Dual Pull Open Bottom Portable Pickup Truck Trailer Unloader System that slides cargo or debris on the bottom of the vehicle to the back of the vehicle where it is unloaded or falls through the open bottom directly onto the ground.

U.S. Pat. Nos. 4,082,136; 4,113,122; and 4,111,318 all utilize a plurality of cables which are laid on the floor of the vehicle and which support loads placed thereon. The cables can be moved whereby loads supported on the cables are moved along the vehicle floor. These inventions are vastly different from the Dual Pull Open Bottom Portable Pickup Truck Trailer Unloader System that slides cargo or debris on the bottom of the vehicle to the back of the vehicle where it is unloaded or falls through the open bottom directly onto the ground.

U.S. Pat. No. 5,143,508 titled Cargo Conveying Vehicle Having a Moveable Bulkhead Located Therein claims (1) A cargo carrying vehicle comprising a body having an interior, an internal floor, a left internal sidewall having an upper edge and a lower edge, a right internal side wall having an upper edge and a lower edge, a longitudinal axis, a front end and a rear end and (2) a moveable bulkhead mounted in said interior. The claims clearly present a box vehicle with permanent sides and floor with a permanently mounted bulkhead that moves forward and backwards through the use of cables and pulleys that stabilize and move the bulkhead from the four corners of the bulkhead utilizing a multitude of pulleys, attachments, motors or pistons. Claim 30 cites a cargo carrying vehicle as cited in claim 17 wherein said internal floor is reciprocating. The 38 claims defining this invention describe a vehicle with a cargo compartment that has a permanently mounted moveable bulkhead therein that is designed to function with a reciprocating floor. This invention is different from the Dual Pull Open Bottom Portable Pickup Truck Trailer Unloader System. The primary difference is that it is portable from vehicle to vehicle. The second difference is that only two tension straps, cables, chains or ropes provide force to the cargo box. The third difference is that the Dual Pull Open Bottom Portable Pickup Truck Trailer Unloader System is a unit that has two side boards and a back board that fit inside a pickup truck or trailer. The portable pickup truck unloader system is vastly different from the permanently mounted moving bulkhead inside a box vehicle.

SUMMARY OF INVENTION

It is an objective of this invention to provide a mechanical device for the easy unloading of pickup trucks. A second objective of this invention is to produce a mechanical device for the unloading of vehicles that is an economical alternative to expensive tilt dump methods of material removal from vehicles. It is a third objective of this invention to produce a mechanical device that can be hand operated or motor operated depending upon application. It is a fourth objective of this invention to create a mechanical apparatus that can be custom fit to specific applications. The dual pull cable, strap (nylon or other), chain, or rope feature provides this versatility for specific design needs and applications.

BRIEF DESCRIPTION OF THE DRAWINGS

The present invention will be more fully understood by reference to the following description of the attached drawing.

DETAILED DESCRIPTION OF THE DRAWING

Figure 1:
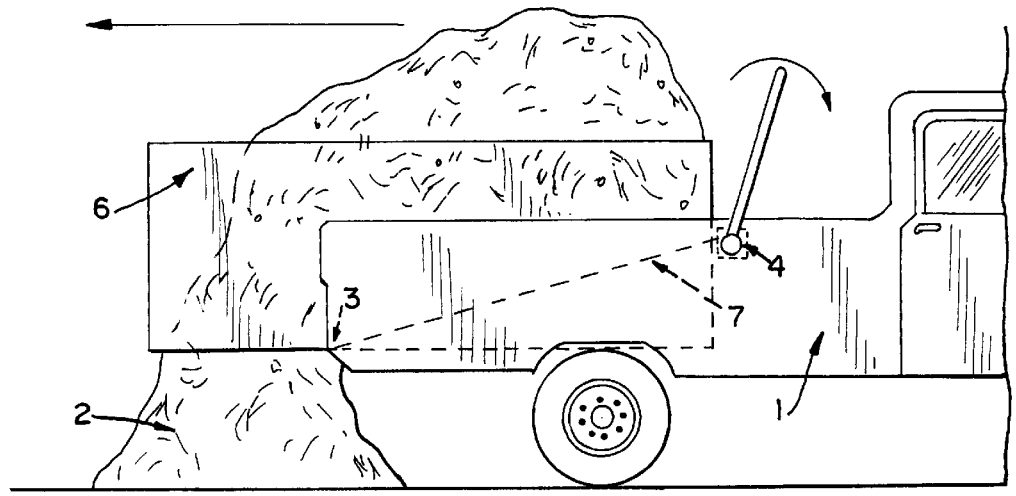
FIG. 1 is a side view of the unloader system in a pickup truck with the debris or cargo falling through the open bottom onto the ground as the unloader box is moved towards the back of the pickup truck.

FIG. 1 is a side view of the unloader system in a pickup truck halfway deployed with debris cargo falling through the open bottom onto the ground. A hand winch (4) connecting both cables, straps, chains, or ropes synchronizes torque when operated (figure shows right cable, strap, chain or rope (7)). The cables, straps, chains, or ropes are attached to the back of the pickup truck (3) and are winched in, thereby pulling the unloader box towards the back of the vehicle. The unloader box comprises two side boards and a back board (right side board shown (6)). The cargo or debris (2) falls through the open bottom onto the ground as the unloader box is moved towards the back of the pickup truck. The unloader box is placed in the bed of a standard pickup truck (1).

Figure 2:
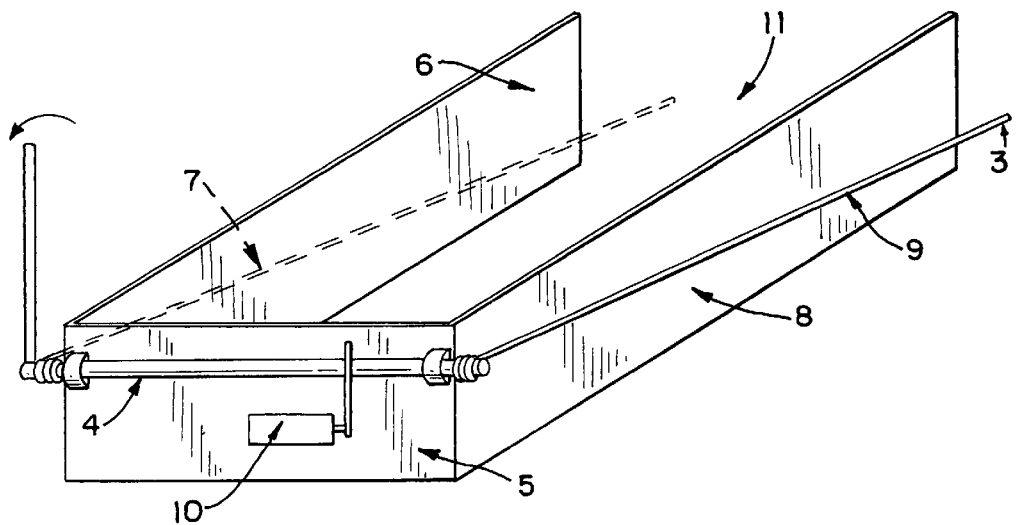
FIG. 2 is a ¾ view of the Dual Pull Open Bottom Portable Pickup Truck Trailer Unloader System with hand operated winch and optional motor drive.

FIG. 2 is a ¾ view of the Dual Pull Open Bottom Portable Pickup Truck Trailer Unloader System with hand operated winch and optional motor drive. The portable unloader system disassembles into components for easy installation and storage. Adjacent to the left side board (8) is the left cable, strap, chain, or rope (9) and adjacent to the right side board (6) is the right cable, strap, chain, or rope (7), both of which serve as the dual pull tension mechanisms. The side boards are attached to the back board (5). A torque winch system can be synchronized by use of a connected bar winch (4) that turns both cables, straps, chains or ropes simultaneously. An optional motor attachment (10) serves as one method of driving the synchronized torque connecting bar. The open bottom of the cargo compartment (11) permits debris or cargo to fall through the open bottom onto the ground.

A dual pull open bottom portable pickup truck trailer unloader system can be a solid back board, a set of two side boards connected to said back board creating the open bottom cargo space and means for connecting synchronized torque that evenly pulls two chains, cables, ropes or straps that run outside the side boards where the mechanical apparatus is connected to the truck or trailer and the ends of the two chains, cables, ropes, or straps connect to said back board and side boards.

A dual pull open bottom portable pickup truck trailer unloader system can also be a solid back board, a set of two side boards connected to said back board forming a U-shaped open ended open bottom cargo space that permits the cargo to slide on the bottom of the truck or trailer when synchronized mechanical pull is applied to two chains, cables, ropes or straps that connect between said back board and side boards and the back of the vehicle.

A dual pull open bottom portable pickup truck trailer unloader system can be mechanically driven by hand, winch, electrical, or hydraulic motor or motors attached to said back board and side-board cargo container either directly mounted to said back board and side boards on the vehicle, whereby connecting the cables, straps, chains or ropes between said back board and side boards and the back of the vehicle provides mechanical tension to move the unloader box toward the back of the vehicle.

A dual pull open bottom portable pickup truck trailer unloader system can include a closed end on the U-shaped back board side board cargo compartment making an open bottom box unloader.

A dual pull open bottom portable pickup truck trailer unloader system can be disassembled for easy storage into components of a back board and two side boards.

I claim:

1. A dual pull open bottom unloader mechanism for placement and use in a pickup truck or truck trailer, having a bed portion and an open back end portion comprising:

an unloader box having a left side, a right side opposing the left side, and a front side intermediate to and connecting the left and right sides, the unloader box defining an interior and an exterior, the box being slidable across the bed portion towards and away from said open back end portion; and a pair of lines exterior to the unloader box and connected to the unloader box, one of the pair of lines being adjacent to the right side of the unloader box, and the other of the pair of lines being adjacent to the left side of the unloader box, and a means for synchronizing torque, said means being secured to said unloader box for moving the box towards and away from the open back end portion, while maintaining an even pull on said lines outside the unloader box.

2. An unloader mechanism according to claim 1 wherein each of the pair of lines has a winding end, and including a rotating member operably connected to the unloader box for winding the lines evenly thereon, wherein the winding end of each of the lines is wound around the rotating member moving the box evenly toward the open back end portion.

3. An unloader mechanism according to claim 2, wherein the rotating member is rotatable by hand, winch, electrical motor or hydraulic motor.

4. An unloader mechanism according to claim 1, wherein the left side, the right side, and the back side, are capable of being disassembled from each other.

5. An unloader mechanism according to claim 1, further including a rear end connecting the left and right sides at an end opposite said front side, thereby forming an open bottom box unloader.

* * * * *